(12) United States Patent
Yu et al.

(10) Patent No.: US 8,677,836 B2
(45) Date of Patent: Mar. 25, 2014

(54) TORQUE SENSOR

(75) Inventors: Chau-Chih Yu, Changhua County (TW); Tsung-Hsien Hu, Changhua County (TW); Chih-Jung Yeh, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 306 days.

(21) Appl. No.: 13/336,226

(22) Filed: Dec. 23, 2011

(65) Prior Publication Data

US 2013/0160569 A1 Jun. 27, 2013

(51) Int. Cl.
*G01L 3/02* (2006.01)

(52) U.S. Cl.
USPC .................................................. 73/862.193

(58) Field of Classification Search
USPC ........................ 73/862.193, 862.331–862.333
See application file for complete search history.

(56) References Cited

U.S. PATENT DOCUMENTS

| | | | | |
|---|---|---|---|---|
| 3,699,249 A | * | 10/1972 | Crane et al. | 358/424 |
| 4,503,713 A | * | 3/1985 | Obayashi et al. | 73/862.328 |
| 4,513,626 A | * | 4/1985 | Obayashi et al. | 73/862.328 |
| 4,611,787 A | * | 9/1986 | May et al. | 254/267 |
| 5,348,126 A | * | 9/1994 | Gao | 192/223.2 |
| 7,412,906 B2 | | 8/2008 | Ponziani | |
| 8,393,232 B2 | * | 3/2013 | Hu et al. | 73/862.338 |
| 2010/0077810 A1 | * | 4/2010 | De Franceschi | 70/283.1 |
| 2010/0162836 A1 | * | 7/2010 | Chiu | 74/64 |

* cited by examiner

*Primary Examiner* — Max Noori
(74) *Attorney, Agent, or Firm* — Christie, Parker & Hale, LLP

(57) ABSTRACT

A torque sensor includes a driving rod, a driving body connected fixedly to the driving rod, and a driving block extending from the driving body and having two opposite pushing surfaces, a driven body permitting the driving body to rotate relative thereto as a result of application of a torque to the driving rod, a driven rod extending from the driven body, and a block-receiving groove formed in the driven body. A first measuring module is connected to the driving block. A second measuring module is connected to the driven body, and cooperates with the first measuring module so as to measure the torque. Two resilient members flank the driving block. Each of the resilient members is disposed between and abuts against the corresponding pushing surface and the driven body.

10 Claims, 9 Drawing Sheets

TORQUE SENSOR

BACKGROUND OF THE INVENTION

1. Field of the Invention

This invention relates to a torque sensor, and more particularly to a high accuracy torque sensor.

2. Description of the Related Art

U.S. Pat. No. 7,412,906 discloses a steering system torque sensor that includes an input shaft, an output shaft, and a collar member sleeved movably on the input shaft and formed with a pair of ramp portions defining camming surfaces. Upon application of a torque to the input shaft, the input shaft is rotated relative to the output shaft to result in rotation of the ramp portions relative to pin followers, thereby causing an axial movement of the collar member along the input shaft by a distance, which leads to a proportional change in a magnetic field and, thus, an voltage output corresponding to the torque.

However, a relatively high precision is required for forming the ramp portions, thereby increasing the manufacturing cost of the torque sensor. Furthermore, wear experienced between the ramp portions and the follower pins results in a decrease in the precision of the ramp portions after the torque sensor is used for a long time period. As such, the measurement accuracy of the steering system torque sensor is low.

SUMMARY OF THE INVENTION

The object of this invention is to provide a torque sensor that has high measurement accuracy and that can be manufactured with relative ease.

According to this invention, there is provided a torque sensor comprising:

a first driving unit including a driving rod, a driving body connected fixedly to the driving rod, and at least one driving block extending from the driving body in a direction away from the driving rod, the driving block being rotatable along a rotating path and having two opposite pushing surfaces disposed along the rotating path;

a second driving unit including a driven body spaced apart from and connected to the driving body and permitting the driving body to rotate relative thereto as a result of application of a torque to the driving rod, a driven rod extending from the driven body in a direction away from the first driving unit, and a block-receiving groove formed in the driven body and permitting the driving block to rotate within the block-receiving groove along the rotating path;

a measuring unit including a first measuring module connected to the driving block, and a second measuring module connected to the driven body and cooperating with the first measuring module so as to measure the torque; and a resilient unit including a pair of resilient members flanking the driving block and disposed along the rotating path, each of the resilient members being disposed between and abutting against a corresponding one of the pushing surfaces and the driven body such that, upon application of the torque, the driving block rotates within the block-receiving groove toward one of the resilient members, so that the one of the resilient members is compressed a distance that is proportional to the torque.

As such, the torque can be measured easily from a moving distance of the driving block or a compressed distance of the one of the resilient members by the measuring unit, so as to improve the measurement accuracy of the torque sensor. Furthermore, a high precision is not required for the driving block and the block-receiving groove, thereby reducing the manufacturing cost of the torque sensor.

BRIEF DESCRIPTION OF THE DRAWINGS

These and other features and advantages of this invention will become apparent in the following detailed description of two preferred embodiments of this invention, with reference to the accompanying drawings, in which.

DETAILED DESCRIPTION OF THE PREFERRED EMBODIMENTS

Figure 1:
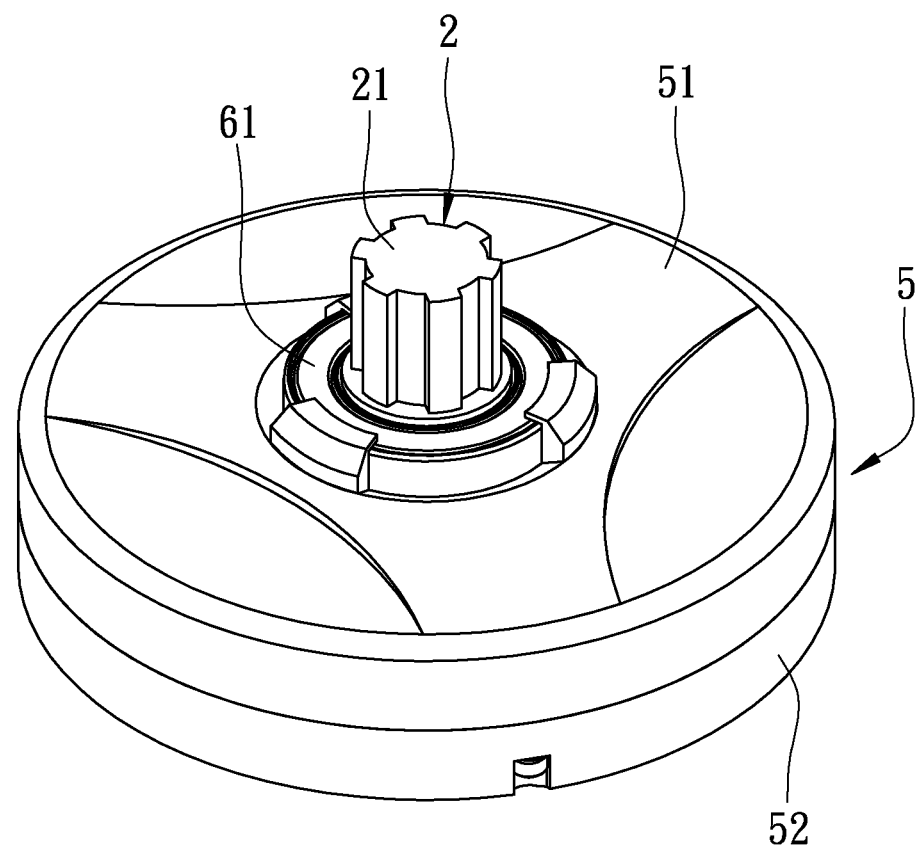
FIG. 1 is an assembled perspective view of the first preferred embodiment of a torque sensor according to this invention.

Before the present invention is described in greater detail in connection with the preferred embodiments, it should be noted that similar elements and structures are designated by like reference numerals throughout the entire disclosure.

Figure 2:
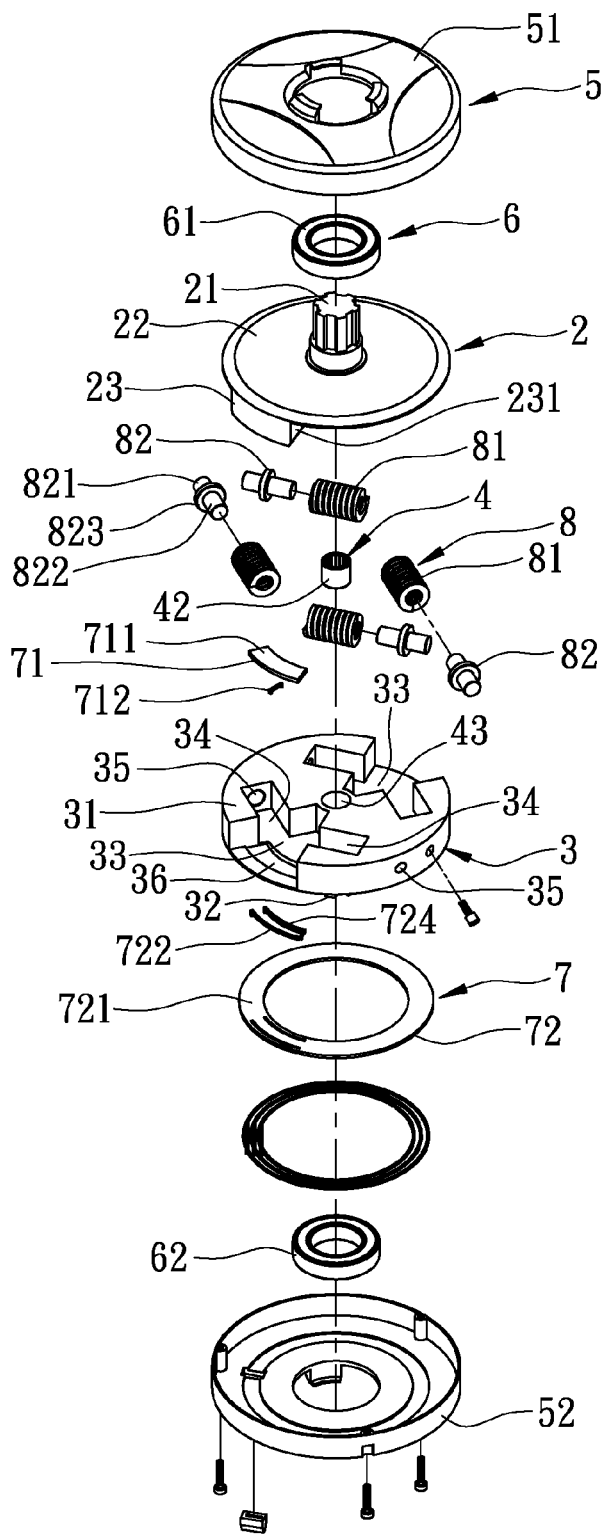
FIG. 2 is an exploded perspective view of the first preferred embodiment.
Figure 3:
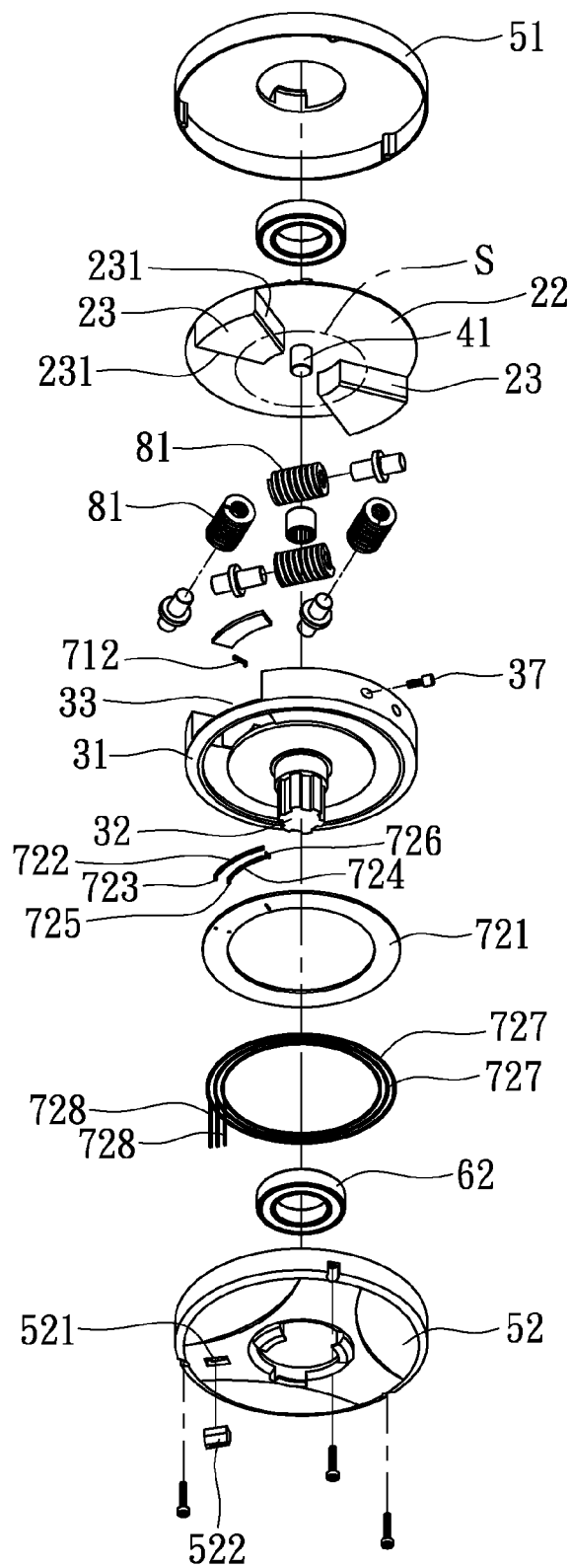
FIG. 3 is another exploded perspective view of the first preferred embodiment, viewed from a different angle.

Referring to FIGS. 1, 2, and 3, the first preferred embodiment of a torque sensor according to this invention includes a first driving unit 2, a second driving unit 3, a pivotal connection unit 4, an outer housing unit 5, a bearing unit 6, a measuring unit 7, and a resilient unit 8.

The first driving unit 2 includes a driving rod 21, a driving body 22 configured as a ring plate and sleeved fixedly on the driving rod 21, and two driving blocks 23 extending from the driving body 22 in a direction away from the driving rod 21. In this embodiment, the driving blocks 23 are diametrically opposite to each other.

Each of the driving blocks 23 is rotatable along a rotating path (S) (see FIG. 3), and has two opposite pushing surfaces 231 disposed along the rotating path (S).

The second driving unit 3 includes a driven body 31 spaced apart from and connected to the driving body 22 and permitting the driving body 22 to rotate relative thereto as a result of application of a torque to the driving rod 21, a driven rod 32 extending from the driven body 31 in a direction away from the driving unit 2, two block-receiving grooves 33 each formed in the driven body 31 and permitting the corresponding driving block 23 to rotate therein along the rotating path (S), two pairs of mounting grooves 34 formed in the driven body 31, two pairs of mounting holes 35 formed in the driven body 31 and in spatial communication with the mounting grooves 34, respectively, and a connecting hole 36 formed through the driven body 31 and in spatial communication with one of the block-receiving grooves 33. The two pairs of the mounting grooves 34 are in spatial communication with the block-receiving grooves 33, respectively, and are disposed along the rotating path (S).

Figure 4:
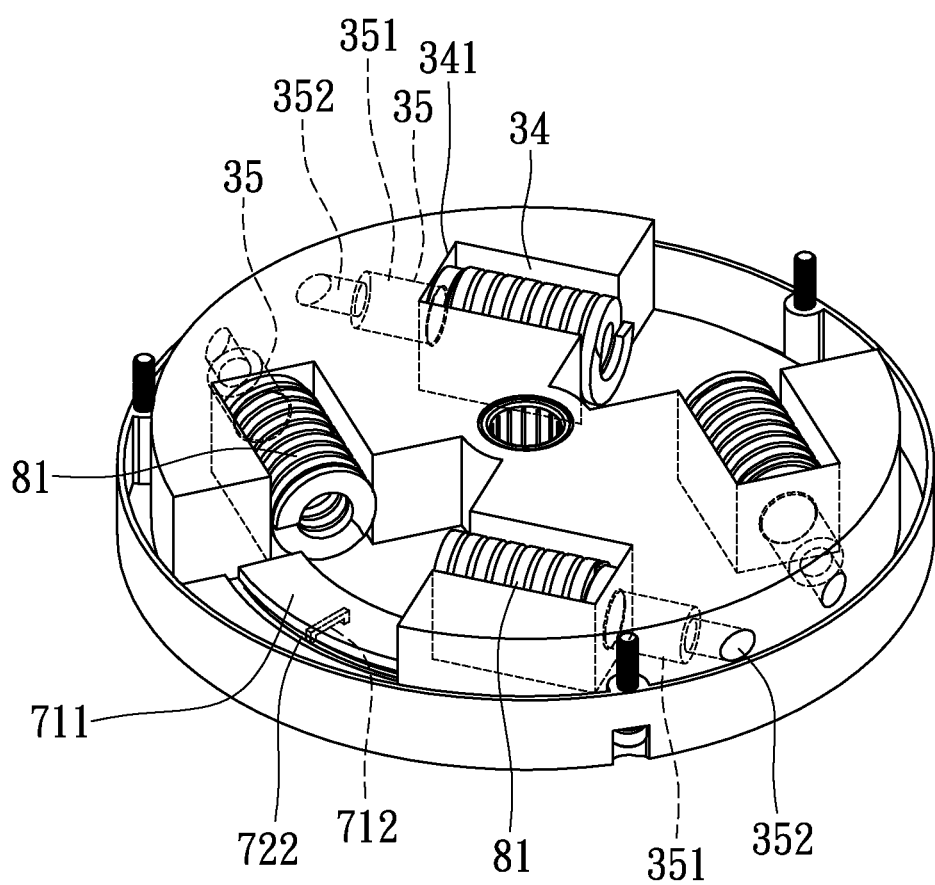
FIG. 4 is a fragmentary perspective view of the first preferred embodiment.

With further reference to FIG. 4, in this embodiment, each of the mounting holes 35 has a non-threaded hole section 351 in spatial communication with the corresponding mounting groove 34, and a threaded hole section 352 connected to the non-threaded hole section 351 and in spatial communication with the surroundings.

The pivotal connection unit 4 is disposed between the first and second driving units 2, 3, and includes a pivot shaft 41 extending from the driving body 22 toward the driven body 31, a bushing 42 sleeved on the pivot shaft 41, and a pivot hole 43 formed in the driven body 31 and receiving rotatably the bushing 42.

The outer housing unit 5 includes a first housing 51 permitting the driving rod 21 to extend therethrough and surrounding the driving body 22, and a second housing 52 permitting the driven rod 32 to extend therethrough, surrounding the driven body 31, and connected removably to the first housing 51 by bolts.

The second housing 52 has a pin-receiving hole 521, and is provided with a pin holder 522 disposed fixedly within the pin-receiving hole 521.

The bearing unit 6 includes a first bearing 61 disposed between the driving rod 21 and the first housing 51, and a second bearing 62 disposed between the driven rod 32 and the second housing 52.

The measuring unit 7 includes a first measuring module 71 connected to one of the driving blocks 23, and a second measuring module 72 connected to the driven body 31 and cooperating with the first measuring module 71 to measure the torque applied to the driving rod 21.

The first measuring module 71 includes a first connecting member 711 connected fixedly to the corresponding driving block 23, and an electric brush 712 connected fixedly to the first connecting member 711 and extending through the connecting hole 36.

The second measuring module 72 includes an annular second connecting member 721 connected fixedly to the driven body 31, a conducting strip 722 connected fixedly to the second connecting member 721 and in slidable contact with the electric brush 712, an output pole 723 electrically connected to the conducting strip 722, a resistor strip 724 connected fixedly to the second connecting member 721 and in slidable contact with the electric brush 712, first and second power supply poles 725, 726 respectively and electrically connected to two opposite ends of the resistor strip 724, three conducting rings 727 disposed fixedly in the second housing 52 and in slidable with the output pole 723, and the first and second power supply poles 725, 726, respectively, and three parallel conductive pins 728 respectively and electrically connected to the conducting rings 727 and extending through the pin-receiving hole 521 and the pin holder 522.

The resilient unit 8 includes two pairs of resilient members 81 disposed respectively within the mounting grooves 34 and abutting respectively against the pushing surfaces 231, and two pairs of positioning rods 82 inserted respectively into the mounting holes 35. Each pair of the resilient members 81 flanks the corresponding driving block 23, and is disposed along the rotating path (S). Each of the resilient members 81 is disposed between and abuts against the corresponding pushing surface 231 and a wall 341 (see FIG. 4) of the driven body 31 defining the corresponding mounting groove 34. In this embodiment, each of the resilient members 81 is configured as a coiled compression spring.

Each of the positioning rods 82 has a mounting rod section 821 disposed within the corresponding mounting hole 35, an insert rod section 822 opposite to the mounting rod section 821 and inserted into the corresponding resilient member 81, and a supporting rod section 823 connected between the mounting rod section 821 and the insert rod section 822, disposed in the corresponding mounting groove 34, having a diameter greater than that of each of the mounting rod section 821 and the insert rod section 822, and abutting against the corresponding resilient member 81. The second driving unit 3 further includes two pairs of adjustment bolts 37 (not shown in FIG. 3, and only one is shown in FIG. 3) engaging respectively the threaded hole sections 352 of the mounting holes 35 and abutting respectively against the mounting rod sections 821 of the positioning rods 82. Each of the adjustment bolts 37 is operable to change the position of the corresponding positioning rod 82 relative to the corresponding driving block 23.

In an application to a steering wheel, during assembly, the driving rod 21 and the driven rod 32 are first connected respectively to two segments of a steering column (not shown). Next, the outer housing unit 5 is mounted to the steering column.

Figure 5:
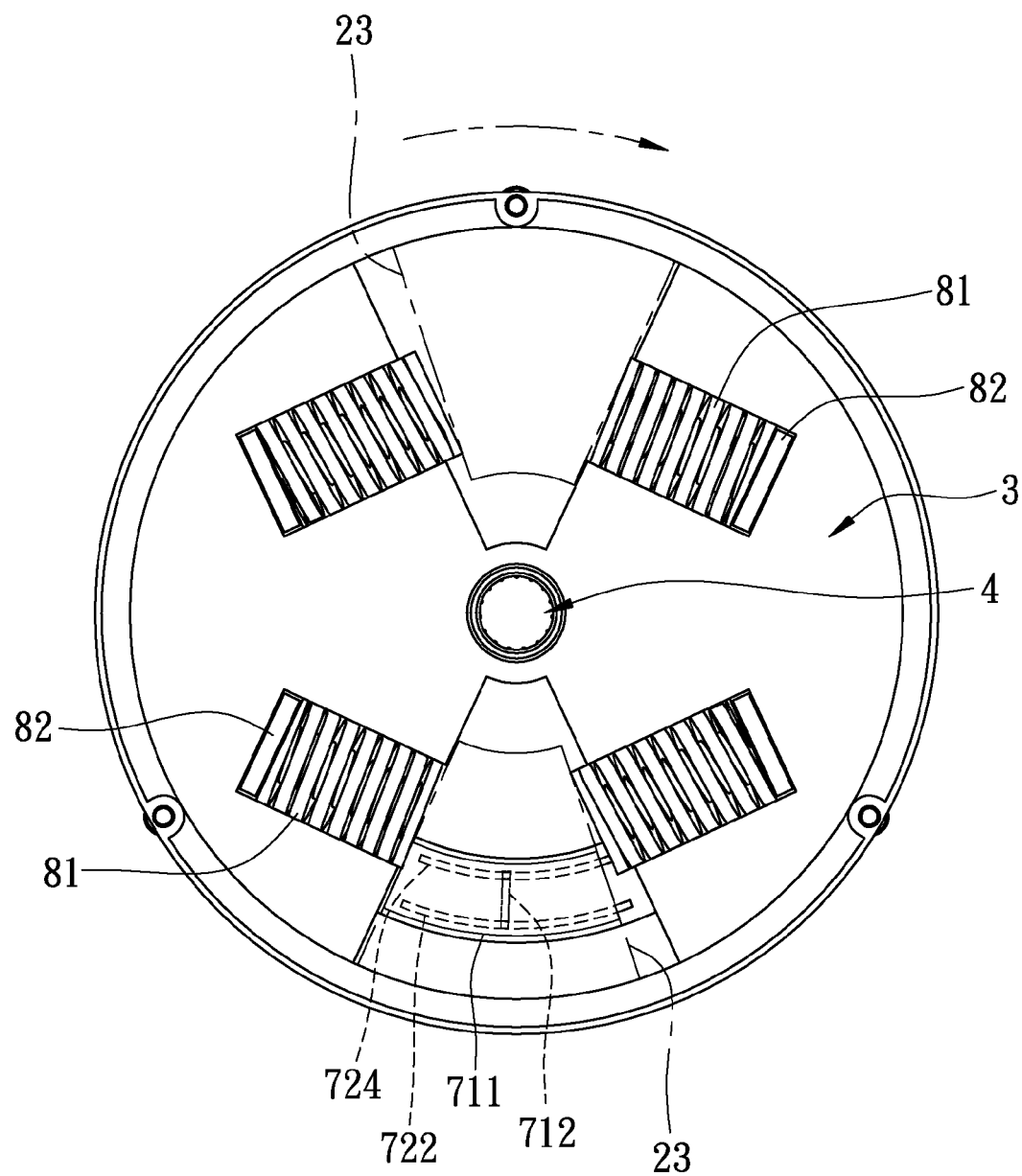
FIG. 5 is a fragmentary schematic view of the first referred embodiment in a state where a torque is applied in a direction.

With further reference to FIG. 5, when a steering torque is applied to the driving rod 21 in a clockwise direction, each of the driving blocks 23 is rotated clockwise within the corresponding block-receiving groove 33 along the rotating path (S) to compress an end of one of the corresponding pair of the resilient members 81. At the same time, an opposite end of the one of the corresponding pair of the resilient members 81 pushes the corresponding positioning rod 82 and, thus, the driven body 31 to rotate about the pivotal connection unit 4.

Figure 6:
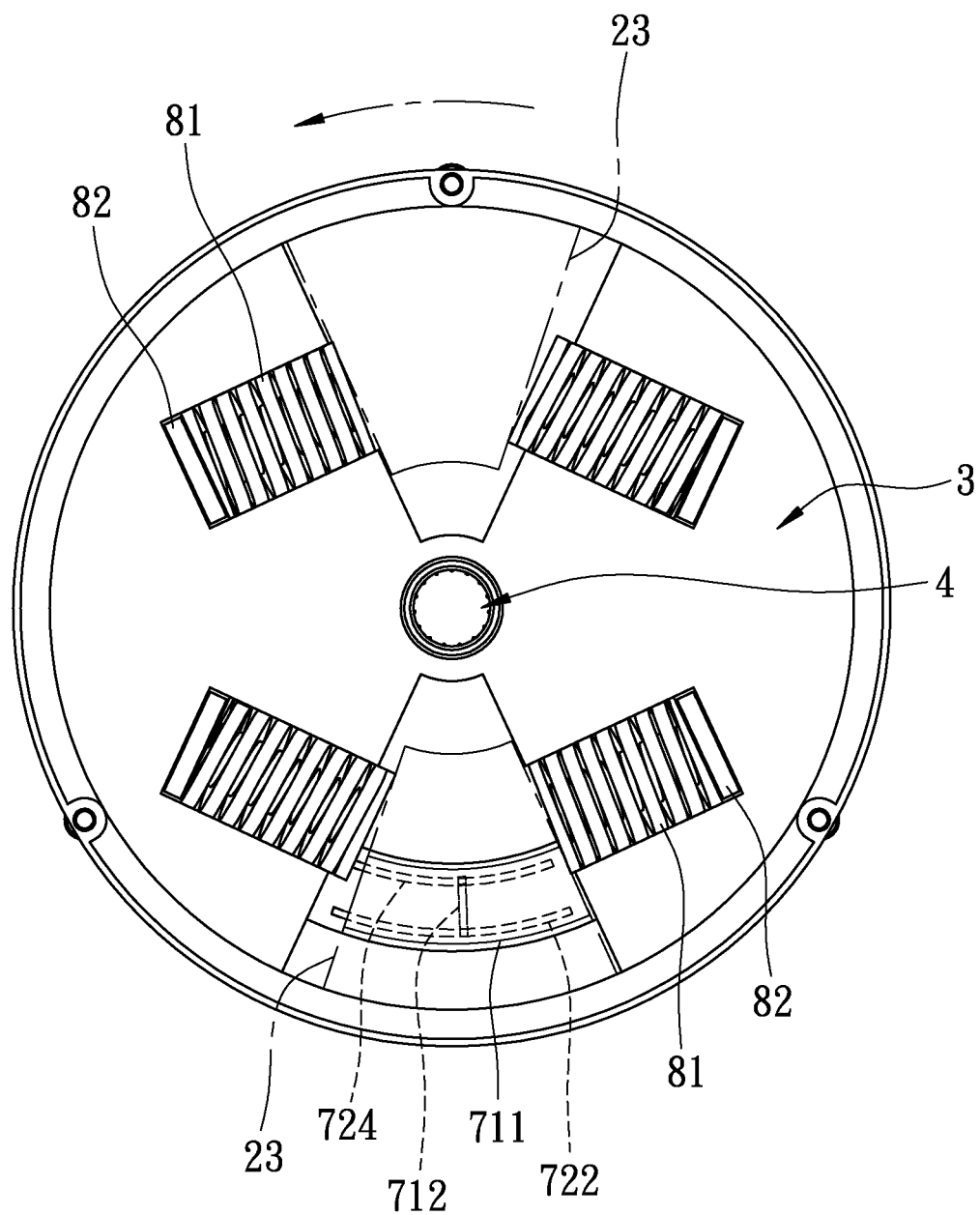
FIG. 6 is another fragmentary schematic view of the first preferred embodiment in a state where a torque is applied in an opposite direction.

With further reference to FIG. 6, when a steering torque is applied to the driving rod 21 in a counterclockwise direction, each of the driving blocks 23 is rotated counterclockwise within the corresponding block-receiving groove 33 along the rotating path (S) to compress an end of the other one of the corresponding pair of the resilient members 81.

Since the electric brush 712 is attached fixedly to the corresponding driving block 23 by the first connecting member 711, and since the conducting strip 722 and the resistor strip 724 are attached fixedly to the driven body 31 by the second connecting member 721, rotation of the corresponding driving block 23 within the corresponding block-receiving groove 33 results in sliding movement of the electric brush 712 on the conducting strip 722 and the resistor strip 724. At the same time, since the conducting rings 727 and the conductive pins 728 are fixed on the second housing 52, the output pole 723, and the first and second power supply poles 725, 726 slide respectively on the conducting rings 727.

As such, the electric brush 712 cooperates with the conducting strip 722, the output pole 723, the resistor strip 724, and the first and second power supply poles 725, 726 to constitute a variable resistor device, so that a voltage output from the output pole 723 varies during sliding movement of the electric brush 712 on the conducting strip 722 and the resistor strip 724.

Since the torque applied to the driving rod 21 is proportional to a force applied by the driving blocks 23 to compress the resilient members 81 and, thus, a compressed distance of each of the compressed resilient members 81 (i.e., a moving distance of each of the driving blocks 23), it can be measured accurately from the voltage output from the output pole 723.

Figure 7:
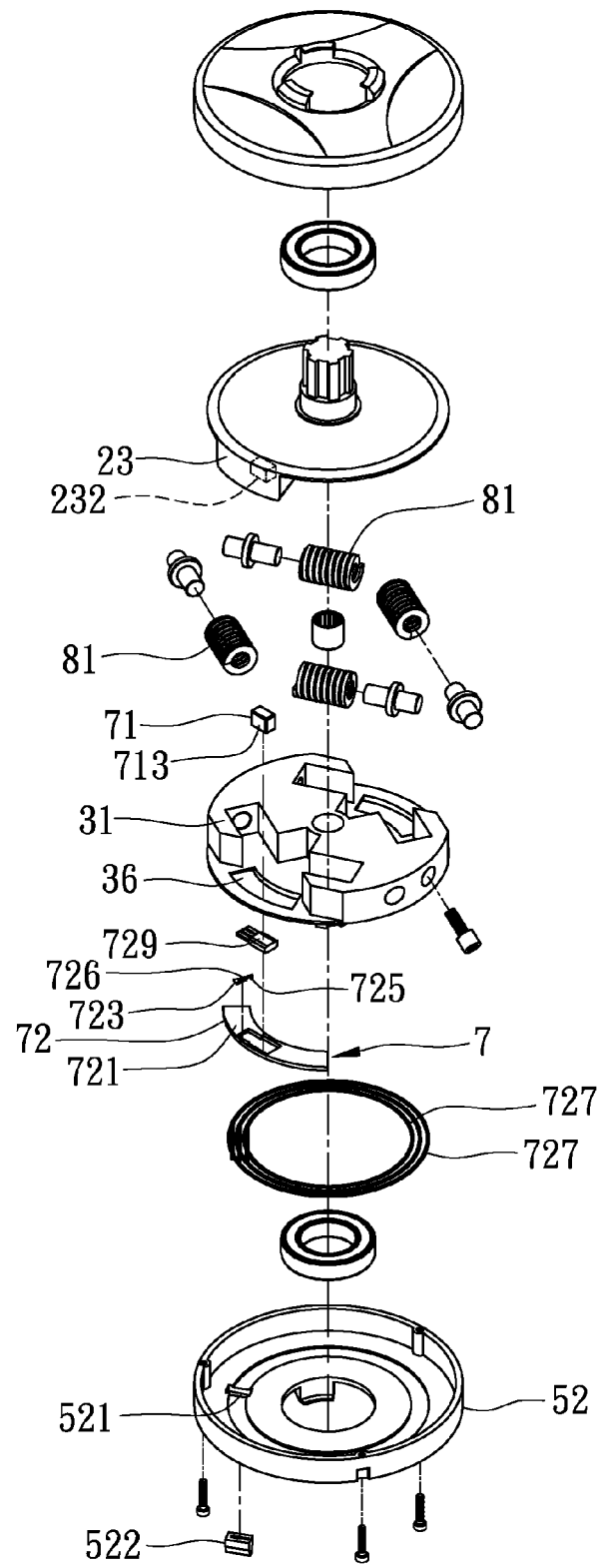
FIG. 7 is an exploded perspective view of the second preferred embodiment of a torque sensor according to this invention.
Figure 8:
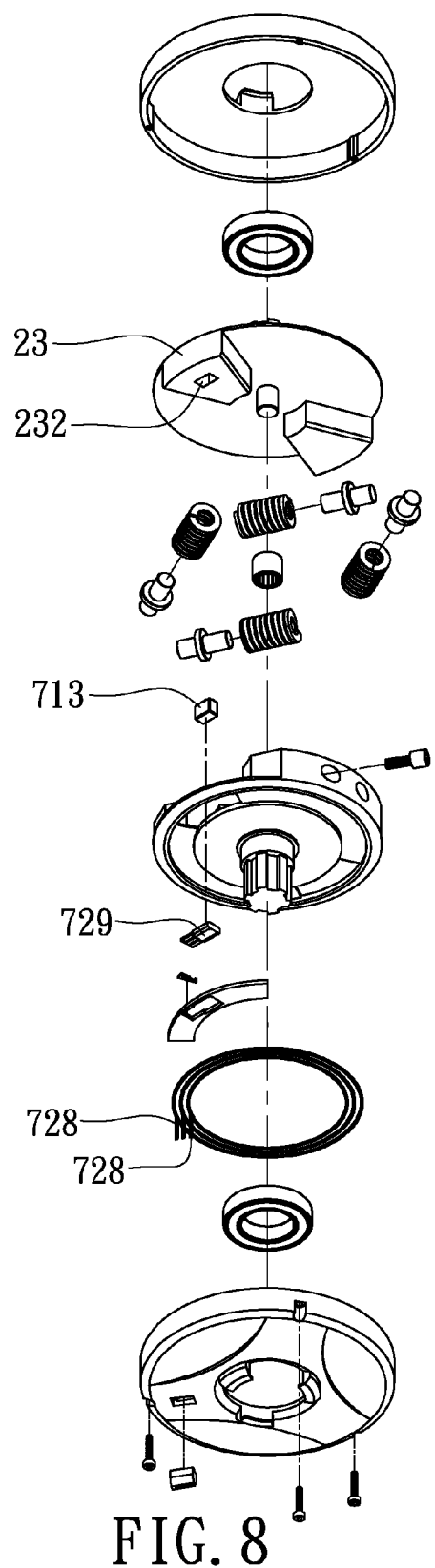
FIG. 8 is an another exploded perspective view of the second preferred embodiment, viewed from a different angle.
Figure 9:
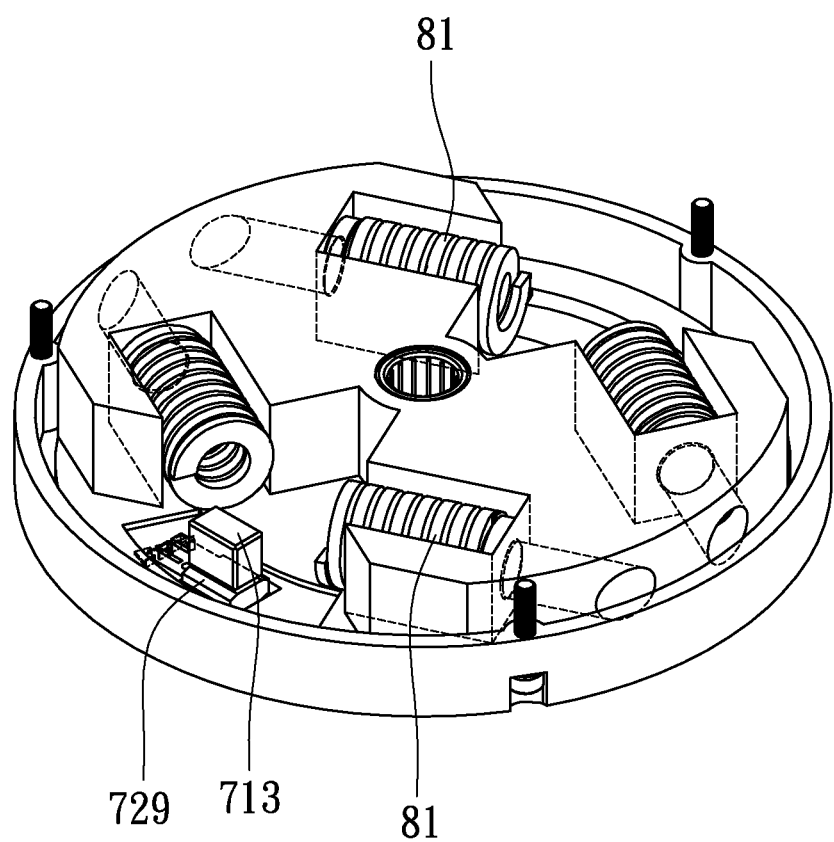
FIG. 9 is a fragmentary perspective view of the second preferred embodiment.

FIGS. 7, 8, and 9 show the second preferred embodiment of a torque sensor according to this invention, which is different from the previous embodiment in the following.

The one of the driving blocks 23 has a cavity 232.

The first measuring module 71 includes a magnet 713 disposed fixedly within the cavity 232. In this embodiment, the first connecting member 711 (see FIG. 2) and the electric brush 712 (see FIG. 2) are omitted from the first measuring module 71.

The second measuring module 72 further includes a magnetic flux sensor 729 connected fixedly to the second connecting member 721 and aligned with the magnet 713 and the connecting hole 36. In this embodiment, the conducting strip 722 (see FIG. 3) and the resistor strip 724 (see FIG. 3) are omitted from the second measuring module 72, the structure of the second connecting member 721 is changed and configured as a curved plate, and the output pole 723, and the first and second power supply poles 725, 726 are electrically connected to the magnetic flux sensor 729.

During use, when the driving blocks 23 compress the corresponding resilient members 81, the magnet 713 moves a distance relative to the magnetic flux sensor 729 to vary a magnetic flux sensed by the magnetic flux sensor 729, so that the torque applied to the driving rod 21 can be measured from a voltage output from the output pole 723.

In view of the above, the torque applied to the driving rod 21 can be measured easily from a moving distance of the driving blocks 23 or a compressed distance of the compressed resilient members 81 by the measuring unit 6. In this manner, the wear issue encountered by the above-mentioned prior art is solved, and the measurement accuracy is improved. Furthermore, since the precision requirement for forming the driving blocks 23 and the block-receiving grooves 33 is relatively low, the manufacturing cost of the torque sensor is reduced. Thus, the object of this invention is achieved.

With this invention thus explained, it is apparent that numerous modifications and variations can be made without departing from the scope and spirit of this invention. It is therefore intended that this invention be limited only as indicated by the appended claims.

We claim:

1. A torque sensor comprising:
   a first driving unit including a driving rod, a driving body connected fixedly to said driving rod, and at least one driving block extending from said driving body in a direction away from said driving rod, said driving block being rotatable along a rotating path and having two opposite pushing surfaces disposed along the rotating path;
   a second driving unit including a driven body spaced apart from and connected to said driving body and permitting said driving body to rotate relative thereto as a result of application of a torque to said driving rod, a driven rod extending from said driven body in a direction away from said first driving unit, and a block-receiving groove formed in said driven body and permitting said driving block to rotate within said block-receiving groove along the rotating path;
   a measuring unit including a first measuring module connected to said driving block, and a second measuring module connected to said driven body and cooperating with said first measuring module so as to measure the torque; and
   a resilient unit including a pair of resilient members flanking said driving block and disposed along the rotating path, each of said resilient members being disposed between and abutting against a corresponding one of said pushing surfaces and said driven body such that, upon application of the torque, said driving block rotates within said block-receiving groove toward one of said resilient members, so that the one of said resilient members is compressed a distance that is proportional to the torque.

2. The torque sensor as claimed in claim 1, wherein said second driving unit further includes a pair of mounting grooves formed in said driven body, in spatial communication with said block-receiving groove, and disposed along the rotating path, said resilient members being disposed respectively within said mounting grooves.

3. The torque sensor as claimed in claim 2, wherein said driving unit further includes a pair of mounting holes in spatial communication with said mounting grooves, respectively, and said resilient unit further includes a pair of positioning rods, each of said resilient members being configured as a coiled compression springs, each of said positioning rods having a mounting rod section disposed within a respective one of said mounting holes, an insert rod sections inserted into a respective one of said resilient members, and a supporting rod section connected between said mounting rod section and said insert rod section and disposed in a respective one of said mounting grooves, said supporting rod section having a diameter greater than that of each of said mounting rod section and said insert rod section and abutting against the respective one of said resilient members.

4. The torque sensor as claimed in claim 3, wherein each of said mounting holes has a threaded hole section in spatial communication with the surroundings, and a non-threaded hole section receiving said mounting rod section of a corresponding one of said positioning rods, and said second driving unit further includes a pair of adjustment bolts engaging respectively said threaded hole sections of said mounting holes and abutting respectively against said mounting rod sections of said positioning rods.

5. The torque sensor as claimed in claim 1, wherein:
   said first measuring module includes a first connecting member connected fixedly to said driving block, and an electric brush connected fixedly to said first connecting member; and
   said second measuring module includes a second connecting member connected fixedly to said driven body, a conducting strip connected fixedly to said second connecting member and in slidable contact with said electric brush, an output pole electrically connected to said conducting strip, a resistor strip connected fixedly to said second connecting member and in slidable contact with said electric brush, and first and second power supply poles respectively and electrically connected to two opposite ends of said resistor strip.

6. The torque sensor as claimed in claim 5, wherein said second driving unit further includes a connecting hole formed through said driven body and in spatial communication with said block-receiving groove, said electric brush extending through said connecting hole to contact said conducting strip and said resistor strip, said torque sensor further comprising an outer housing unit, said driving body and said driven body being disposed rotatably within said outer housing unit, said second measuring module further including three conducting rings disposed fixedly in said outer housing unit and in slidable contact with said output pole, and said first and second power supply poles, respectively, and three conductive pins respectively and electrically connected to said conducting rings.

7. The torque sensor as claimed in claim 1, wherein:
   said driving block further has a cavity;
   said first measuring module includes a magnet disposed fixedly within said cavity; and said second measuring module includes a magnetic flux sensor connected to said driven body, an output pole electrically connected to said magnetic flux sensor, and first and second power supply poles electrically connected to said magnetic flux sensor.

8. The torque sensor as claimed in claim 7, wherein said second driving unit further includes a connecting hole formed through said driven body and in spatial communication with said block-receiving groove, said connecting hole being aligned with said magnet and said magnetic flux sensor, said torque sensor further comprising an outer housing unit, said driving body and said driven body being disposed rotatably within said outer housing unit, said second measuring module further including three conducting rings disposed fixedly in said outer housing unit and in slidable contact with said output pole, and said first and second power supply poles, respectively, and three conductive pins respectively and electrically connected to said conducting rings.

9. The torque sensor as claimed in claim 1, further comprising an outer housing unit and a bearing unit, said outer housing unit including a first housing permitting said driving rod to extend therethrough and surrounding said driving body, and a second housing permitting said driven rod to extend therethrough, surrounding said driven body, and connected removably to said first housing, said bearing unit including a first bearing disposed between said driving rod and said first housing, and a second bearing disposed between said driven rod and said second housing.

10. The torque sensor as claimed in claim 1, further comprising a pivotal connection unit disposed between said first and second driving units, said pivotal connection unit including a pivot shaft extending from said driving body toward said driven body, a bushing sleeved on said pivot shaft, and a pivot hole formed in said driven body and receiving rotatably said bushing.

* * * * *